United States Patent [19]

Rau

[11] 4,444,809

[45] Apr. 24, 1984

[54] METHOD OF AND DEVICE FOR FABRICATING VISION PANELS

[75] Inventor: Robert B. Rau, Canyon City, Calif.

[73] Assignee: PPG Industries, Inc., Pittsburgh, Pa.

[21] Appl. No.: 331,000

[22] Filed: Dec. 15, 1981

[51] Int. Cl.³ .................................................. B05D 5/06
[52] U.S. Cl. ........................................ 427/163; 52/827;
118/504; 118/505; 156/90; 156/285; 156/382;
427/164; 427/272; 427/282; 427/284; 427/287;
427/208.6
[58] Field of Search ............... 427/282, 284, 287, 272,
427/208.4, 208.6, 163, 164; 156/106, 99, 285,
382, 546, 107, 90; 428/192; 52/827; 118/504,
505

[56] References Cited

U.S. PATENT DOCUMENTS 2,627,839  2/1953  Hudgins et al. .................... 118/505

FOREIGN PATENT DOCUMENTS 1526531  9/1978  United Kingdom ............... 118/505

Primary Examiner—Edward C. Kimlin
Assistant Examiner—Timothy W. Heitbrink
Attorney, Agent, or Firm—Donald C. Lepiane; Lee Patch

[57] ABSTRACT

A protective device for protecting the viewing area of a vision panel from encroachment by flowable cement compositions used to bond reinforcing members to the edge portions of the viewing panel. The protective device is preferably formed of a material non-adherent to both the vision panel surface and the cement composition, and may include vacuum biasing facilities and an edge seal to provide a fluid barrier to the passage of the flowable cement compositions.

3 Claims, 3 Drawing Figures

METHOD OF AND DEVICE FOR FABRICATING VISION PANELS

FIELD OF THE INVENTION

The invention relates to the fabrication of vehicle vision panels, and more particularly, to cementing edge reinforcing members to plastic aircraft vision panels.

DISCUSSION OF THE TECHNICAL PROBLEM

When the periphery of a plastic aircraft vision panel is rigidly mounted, e.g., by bolts, rivets, etc., into an air frame, it is subjected to forces which can crack or crush edge portions of the vision panel. Thus, it is often desirable to mount reinforcing members to the marginal and/or peripheral edges of the plastic vision panel before it is mounted in the air frame. Commonly, such reinforcing members are cemented to the edges of the vision panel with a cement which reacts with the plastic of the vision panel to provide the requisite degree of adhesion. However, such cements also detrimentally affect the optical properties of the plastic vision panel and must therefore be prevented from contacting the inboard viewing area of the part. Heretofore, the vision area has been masked off from the edge portion of the vision panel by tape which is manually applied inboard of the marginal edge portions of the vision panel. This technique required substantial manual labor and attention to detail. It would be advantageous to have a device for and a method of attaching reinforcing members to a vision panel which avoids the limitations discussed above.

SUMMARY OF THE INVENTION

The present invention provides a device for and a method of adhesively attaching reinforcing members to a vision panel in a manner which prevents an adhesive from contacting an adjacent viewing area of the vision panel. The invention includes a protective member which is positionable over and conformable to surface contour portions of the viewing area. The protective member has a nonadhering engaging surface relative to the vision panel and includes fluid barrier means at least portions of which define the desired boundary between the viewing area and the area to which attachment is desired. Facilities maintain the protective member over the viewing area with the fluid barrier means in biased surface engagement with the panel to define the desired boundary and to prevent passage of the adhesive from the attachment area to the viewing area. Preferably, the protective member is maintained in position on the viewing area by drawing a vacuum through a vacuum channel in the engaging surface of the protective member. Further, the fluid barrier means may include a flexible edge seal extending from the engaging surface of the protective member toward the surface of the vision panel. Additionally, in a preferred embodiment of the invention, at least the marginal and peripheral edge portions of the protective member are formed of a material to which the adhesive is substantially nonadherent, e.g., silicone rubber.

DESCRIPTION OF THE INVENTION

Figure 1:
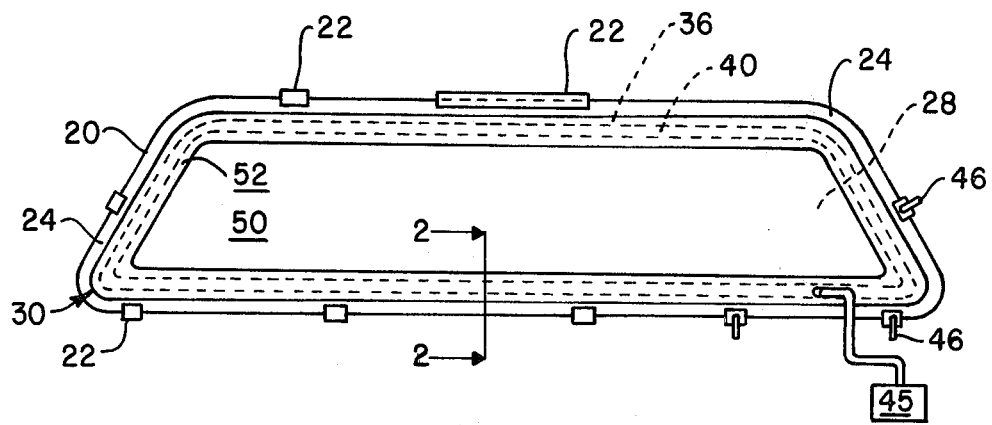
FIG. 1 is a top plan view of a vision panel having reinforcing members being attached to edge portions thereof, including a protective member incorporating features of the present invention engaged to a major surface thereof.

FIG. 1 shows an aircraft vision panel 20 positioned for the application of a plurality of reinforcing members 22 on its marginal edge portions 24.

The reinforcing members 22 are commonly provided adjacent the marginal edge portions 24 of an aircraft vision panel 20 to protect the vision panel 20 from cracking or crushing which might otherwise occur when the vision panel 20 is rigidly mounted, e.g., bolted or riveted, into an air frame. The configuration of the reinforcing members 22 are not limiting to the present invention, as they may take the form of a plurality of individual members 22 as shown in FIG. 1, or alternatively, they may take the form of an elongated band positionable adjacent substantial segments of or all of the marginal edge portions 24 of the vision panel 20.

Figure 2:
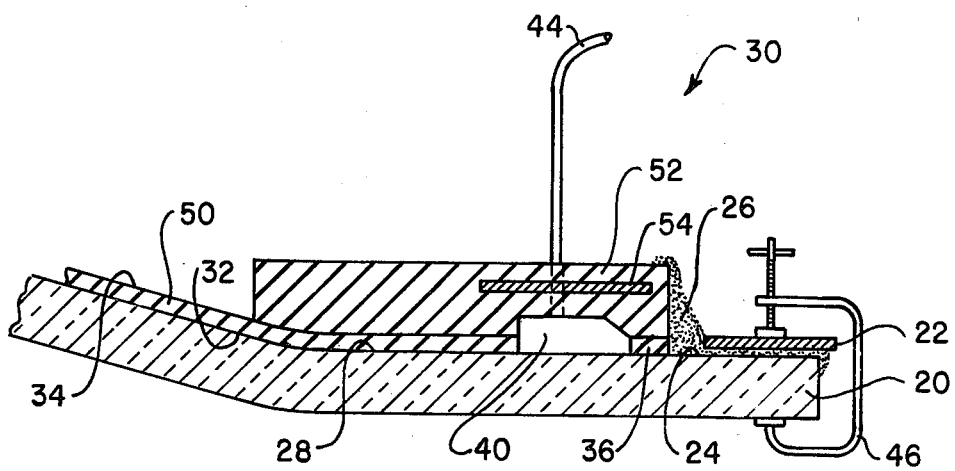
FIG. 2 is a view taken along line 2—2 of FIG. 1, showing further details of the practice of the present invention.

The reinforcing members 22 may be formed of acrylic materials or they may be laminated members formed of materials such as fiberglass, nylon, orlon, etc. With reference to FIGS. 1 and 2, the reinforcing members 22 are bonded to the vision panel 20 by a cement composition 26 which is applied between the marginal surface portions of the vision panel 20 and the reinforcing members 22. As best shown in FIG. 2, the reinforcing members 22 may be bonded to one marginal edge portion 24 of a surface of the vision panel 20, although the invention is not limited thereto, for alternatively, the reinforcing members 22 may be bonded to any combination of opposed marginal edge portions of both surfaces and/or the peripheral edge of the vision panel 20.

The cement composition 26 is selected in the practice of the present invention to provide the desired level of adhesion between the vision panel 20 and the reinforcing members 22. Where the vision panel 20 has a bonding surface of an acrylic material, it is preferred to select an acrylic-based cement which reacts with the bonding surface to provide the desired adhesion. Although not limiting to the invention, cements which may be useful in this type of environment satisfy MIL-A-8576B, which is incorporated by reference herein, and may include a three-component product marketed as Weld-On 28 by Industrial Polychemical Service of Gardenia, California, or a product marketed as PS-18 by the Rohm and Haas Company. Commonly the cement composition 26 is applied onto the surface of the vision panel 20 in a relatively thick layer, e.g., 0.06 to 0.1 inches (0.15 cm. to 0.25 cm.), while the cement is in a flowable state. Because the cement composition 26 commonly used detrimentally affects the optical quality of the vision panel surface, it is necessary to protect the viewing area of the vision panel from contact with the adhesive. In the past this was accomplished by manually masking off the inner viewing area 28 of the vision panel 20 from the marginal edge portion 24 with tape.

Figure 3:
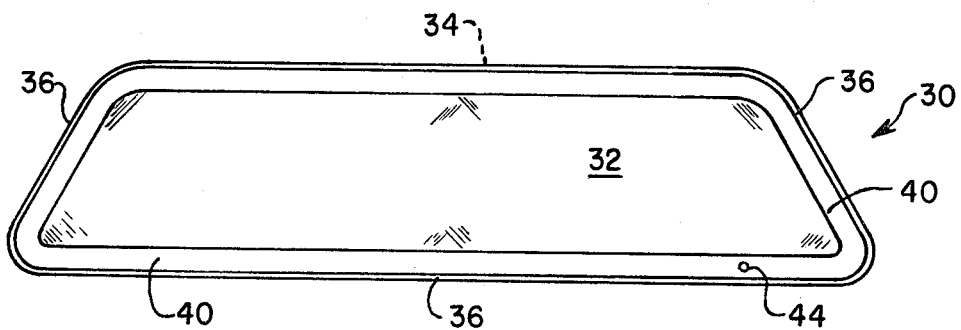
FIG. 3 is a bottom plan view of the engaging surface of a protective member incorporating features of the present invention.

In the practice of the present invention, there is provided a protective device 30 which is generally positionable over a designated viewing area 28 to prevent the flow of the cement composition 26 from marginal edge portion 24 into the view area 28 of the vision panel 20. With reference to FIGS. 1-3, the protective device 30 preferably has an engaging major surface 32 and an opposite non-engaging major surface 34. The engaging surface 32 is positioned over the surface of the vision panel 20 to which the cement composition 26 is principally to be applied. A fluid barrier, e.g., edge seal 36 (best seen in FIG. 2), engages the vision panel surface to define a boundary between the viewing area 28 and the marginal edge portions 24. An endless channel 40 provided in the engaging surface 32 is positioned inboard of the edge seal 36 and communicates through vacuum line 44 with a source of vacuum 45. The engaging surface 32 of the protective device 30 is formed of a material which is substantially non-adherent to the vision panel surface and in a preferred embodiment of the invention, the protective device 30 is formed of a material, e.g., silicone rubber, to which the selected cement composition 26 is substantially non-adherent.

In a preferred embodiment of the invention, the protective device 30 includes silicone rubber sheet 50 having a thickness of about ⅜ inch (0.95 cm.). An upraised marginal edge portion 52 is preferably cast to the non-engaging major surface 34 of the sheet 50 of a material which is non-adherent to the selected cement composition to be used. Preferably the upraised edge portion 52 includes elongated edge support members 54 therein, e.g., aluminum bands, to provide increased structural stability to the protective device 30 during temporary edge clamping, etc. As best shown in FIG. 2, the vacuum channel 40 is conveniently machined from the sheet 50 and the upraised edge portion 52 to leave the edge seal 36 extending about the periphery of the protective device 30. The vacuum channel 40 may be about ½ inch (1.27 cm.) in width. A vacuum between about 15 inches of mercury and about 20 inches of mercury has proved sufficient to bias the edge seal 36 toward the vision panel surface to prevent the passage of the cement composition 26 onto the viewing area 28. The protective device 30 has sufficient flexibility to conform to the surface configurations of flat, concave or convex vision panels 20.

In operation, a vision panel 20 is conveniently and horizontally supported and thereafter a protective device 30 having an edge seal 36 with a desired peripheral configuration corresponding to the shape of the desired viewing area 28 is positioned thereon. Because the engaging surface 32 is substantially non-adherent to the vision panel surface, the protective device 30 may be conveniently moved relative to the vision panel surface to adjust it to a desired position with a minimum of manual effort or delay. When the protective device 30 is properly positioned, it is temporarily clamped to the vision panel 20 and a vacuum is drawn between the engaging surface 32 and the vision panel surface through the vacuum channel 40, thus biasing the surface 32 and the edge seal 36 against the vision panel surface to form a fluid barrier. The exposed marginal edge portion 24 is abraded to improve the adhesion of the selected cement composition. A relatively thick layer 26, e.g., 0.1 inch (0.25 cm.), of a cement composition 26 selected from those enumerated above is applied to desired segments of the marginal edge portion 24 in any convenient manner, e.g., by brushing. The cement composition 26 is applied in a flowable state and remains so for about five minutes, during which time the reinforcing members 22 are positioned at the edge of the vision panel 20 and holding devices, e.g., clamps 46, may be applied to bias the reinforcing members 22 toward the surface of the vision panel 20. With reference to FIGS. 1 and 2, biasing the reinforcing members 22 toward the surface of the vision panel 20 flows the cement composition 26 out from between the reinforcing members 22 and the vision panel surface. In the absence of the practice of the present invention the cement composition 26 would encroach onto the viewing area 28 to detrimentally affect its optical quality. Instead, in the practice of the present invention the cement composition 26 is precluded from passing along the surface of the vision panel 20 onto the viewing area 28 by the cooperation of the vacuum channel 40 and the edge seal 36 of the protective device 30. Any excess cement composition 26 remains on the peripheral edge or the nonengaging surface 34 of the protective device 30, where it cures. As before mentioned, the cement-contacting portions of the protective device 30 are preferably formed of a material to which the cured cement composition 26 does not substantially adhere, so that clean-up is greatly facilitated. The holding devices 46 are maintained in position on the reinforcing members 22 until the cement composition 26 is sufficiently cured, e.g., about 20 minutes, afterwhich the protective device 30 and the holding devices 46 may be removed from the vision panel 20.

Of course, the invention is not intended to be limited by the description of the specific embodiments contained herein, but by the claims which follow.

I claim:

1. A method of preventing the flow of an adhesive onto viewing area of a plastic aircraft vision panel from a contiguous second area of the panel to which the adhesive is to be applied, wherein the adhesive is of the type that (1) reacts with the plastic panel to bond reinforcing members thereto and (2) detrimentally affects optical characteristics of the viewing area, comprising the steps of:

biasing a member toward the contiguous second area of the panel, the member having an engaging surface which is substantially non-adherent to the surface of the plastic panel to which the adhesive is to be applied and to the adhesive, the member positionable over and conformable to at least portions of the viewing area adjacent the interface of the viewing area and the second area and having a fluid barrier means including a silicone rubber edge seal for engaging the panel surface to define portions of the boundary between the viewing area and the contiguous second area;

drawing a vacuum between portions of the member and the panel to urge the silicone rubber edge seal against the panel surface along the boundary between the viewing area and second contiguous area; and applying the adhesive to the second contiguous area of the panel while the fluid barrier means prevents the flow of the adhesive from the second contiguous area onto the viewing area.

2. The method as set forth in claim 1 wherein said vacuum drawing step is practiced immediately inboard of the flexible edge seal to bias the flexible edge seal to the substrate surface along the boundary between the first and second contiguous areas.

3. The method as set forth in claim 2, wherein the plastic is an acrylic material and wherein the adhesive is an acrylic resin base cement satisfying MIL-A-8576B.

* * * * *